United States Patent [19]

Boots

[11] 4,151,719

[45] May 1, 1979

[54] WATER POWER APPARATUS

[76] Inventor: Arthur A. Boots, 125 Main, Noel, Mo. 64854

[21] Appl. No.: 747,924

[22] Filed: Dec. 6, 1976

[51] Int. Cl.² ........................... F03B 7/00; F03B 9/00; F01D 23/00

[52] U.S. Cl. .......................................... 60/639; 415/5

[58] Field of Search ................... 415/5, 202; 417/329, 417/362; 290/43, 44, 54, 55; 60/639; 198/702, 703, 706, 532, 549; 185/4, 27

[56] References Cited

U.S. PATENT DOCUMENTS

| | | | |
|---|---|---|---|
| 486,809 | 11/1892 | McCaslin | 415/5 |
| 675,156 | 5/1901 | Hoshor | 415/5 |
| 730,541 | 6/1903 | Joor | 198/703 |
| 811,125 | 1/1906 | Bucher | 198/706 |
| 827,845 | 8/1906 | Bloss | 415/5 |
| 836,865 | 11/1906 | Cole | 198/702 |
| 920,361 | 5/1909 | Merriam | 415/5 |
| 1,054,305 | 2/1913 | Mueller | 198/706 |
| 1,435,730 | 11/1922 | Parsons et al. | 198/549 |
| 1,457,927 | 6/1923 | Ebel | 415/5 |
| 1,567,971 | 12/1925 | Martin et al. | 415/5 |
| 2,104,984 | 1/1938 | Grondahl | 415/5 |
| 2,323,920 | 7/1943 | Knudsen | 198/702 |
| 2,435,498 | 2/1948 | Hapman | 198/706 |
| 2,758,814 | 8/1956 | Kratz | 415/5 |

Primary Examiner—John J. Vrablik
Attorney, Agent, or Firm—Schmidt, Johnson, Hovey & Williams

[57] ABSTRACT

A water motor has an endless series of buckets arranged for movement about a generally rectangular path of travel to present an uppermost, horizontal, loading flight whereby each bucket may be completely filled with water from an overlying basin prior to its descent along a vertical power flight of the motor. The buckets are pivotally supported for free swinging movement and there is provided a trip mechanism adjacent the lowermost end of the power flight for individually emptying the buckets at the end of their descent. A water outlet in the overlying basin extends longitudinally along the full length of the loading flight and is provided with a baffle for controlling the flow of water to the buckets. A pair of endless roller chains secured at opposite ends of the respective buckets are operably coupled with an output shaft for powered rotation of the latter in response to movement of the buckets along their rectangular path of travel.

8 Claims, 4 Drawing Figures

WATER POWER APPARATUS

This invention relates to water motors of the type intended to harness the kinetic energy in a flow from a head of water. More particularly, the invention concerns a motor as described wherein there is provided an endless series of buckets arranged in such a manner as to present a substantially horizontal uppermost flight whereby the buckets may be completely filled with water prior to descending along the vertical power flight.

Water motors are well-known in the art as shown for example in U.S. Pat. Nos. 1,567,971, issued to Martin et al, and 2,758,814, issued to Kratz. Such devices typically employ an endless series of water-carrying troughs supported in such a manner that the troughs descend from an uppermost filling zone to a lower dumping area and then ascend to the filling area. The motor is powered by gravitational forces acting on the water-laden buckets through the vertical drop between the filling zone and the dumping area. The endless series is mechanically coupled with an output shaft in some manner such that movement of the series along its circuitous path of travel causes powered rotation of the output shaft.

One problem with prior art water motors is their general inability to efficiently use all of the water supplied at the top of the pressure head. In this connection, the water is typically introduced to the buckets in an overshoot manner such that much of the water simply is not captured in any of the water buckets. The problem is particularly acute in flow-of-the-stream installations which have no storage capabilities.

Additionally, the method of filling the water buckets employed in the prior art devices results in the buckets traveling through at least a portion of the vertical drop in only a partially filled condition such that the full efficiency of the motor is not realized. While certain approaches have been taken to correct the above-mentioned problems (see for example Grondahl, U.S. Pat. No. 2,104,984, such solutions normally present complicated structure, making them impractical from an economic standpoint.

Accordingly, it is an important object of the present invention to provide a water motor with an endless series of buckets having an uppermost, horizontally disposed filling flight whereby the buckets may be completely filled with water prior to their descent through the vertical drop.

It is another important object of my invention to provide a device as above wherein the series presents a generally rectangular configuration having not only a horizontal uppermost stretch, but also a horizontal lowermost flight and a pair of vertical flights extending therebetween such that the loaded buckets move only vertically during their descent.

It is yet another important object of the instant invention to provide a water motor as above wherein the buckets are supported for free-swinging movement and there is presented a trip mechanism adjacent the lowermost portion of the vertical descent stretch for dumping water from the buckets once they have completed their downward movement.

Figure 4:
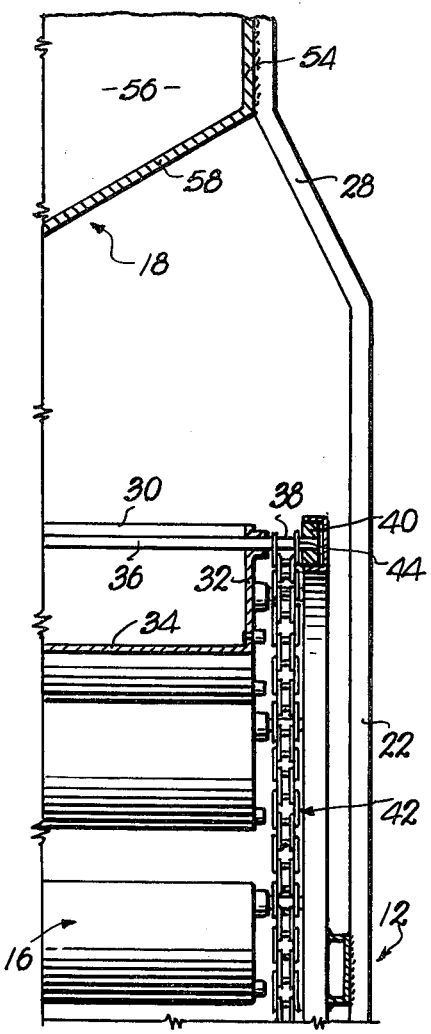
FIG. 4 is a partial cross-sectional view taken along line 4—4 of FIG. 1.
Figure 1:
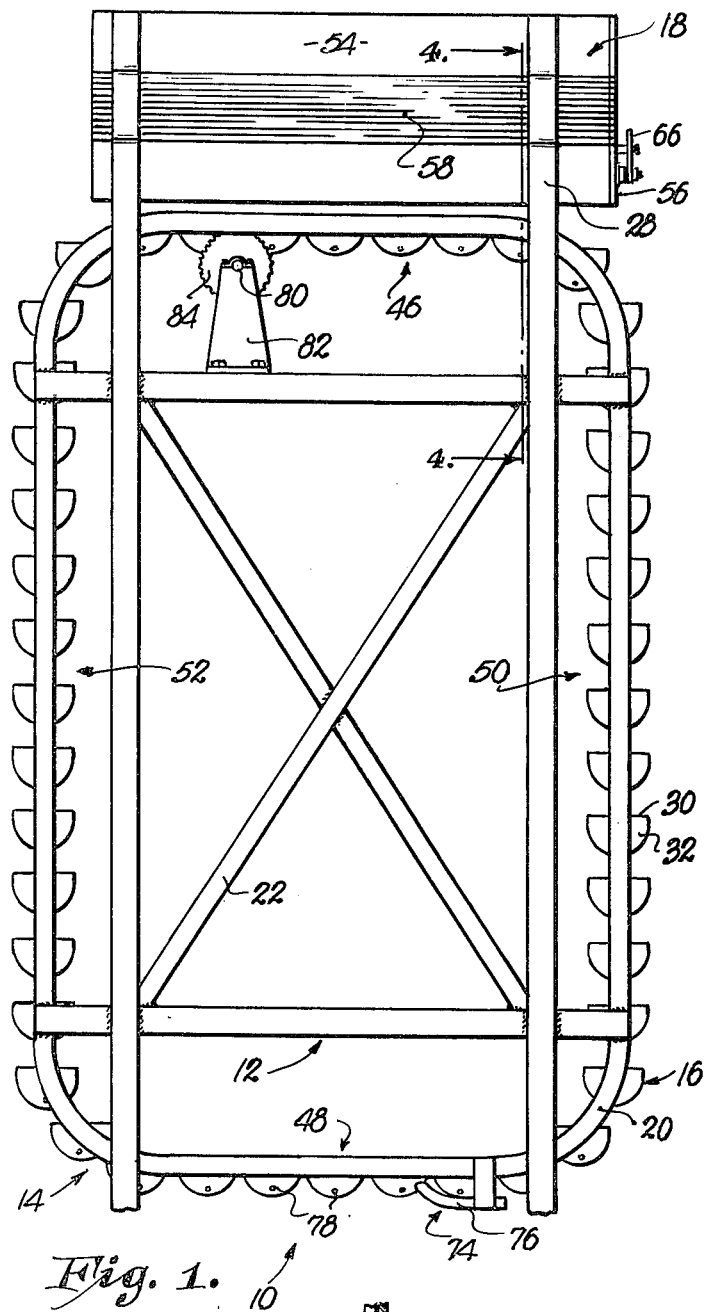
FIG. 1 is a side elevational view of a water motor constructed in accordance with the principles of the present invention.

In FIG. 1 there is shown a water motor 10 comprising essentially a rectangular frame 12 supporting an endless series 14 of buckets 16 beneath an overlying water basin 18. The frame 12 includes a pair of laterally spaced tracks 20, each disposed in an upright plane and configured to define a rectangular path of travel for circuitous movement of series 14 in a manner to be described hereinbelow.

A pair of spaced support grids 22 maintain the tracks 20 in their rectangular configuration and conventional cross members (not shown) extend between the respective grids 22 in reinforcing relationship to the latter. In the preferred embodiment, each grid 22 has a pair of depending legs 24 adapted for securement in a permanent installation such as concrete footings 26 (shown only in FIG. 2). A pair of extensions 28 on each grid 22 project upwardly beyond the uppermost portion of respective tracks 20 for supporting engagement with basin 18.

Each bucket 16 has an open top 30, a pair of spaced, substantially semicircular ends 32 extending downwardly from top 30, and an elongate, generally U-shaped panel 34 extending between ends 32 to define a rounded bottom and straight sidewalls. The buckets 16 each have an elongate pivot rod 36 which extends essentially the full length of the bucket 16 parallel to the panel 34 and has a pair of outer lengths 38 extending beyond respective semicircular ends 32. Each length 38 terminates in a roller 40 adapted for captive rolling engagement with respective tracks 20 in a manner well known in the art. By this construction, each bucket 16 is supported from a pivot 36 for restrained movement around the rectangular path of travel defined by tracks 20.

As seen in FIG. 1, the series 14 are arranged around tracks 20 in a manner presenting an uppermost horizontally disposed filling flight 46, an opposed, lowermost horizontal flight 48, and descending and ascending flights 50 and 52 respectively extending vertically between flights 46 and 48. It is to be understood that as viewed in FIG. 1, the series 14 moves around tracks 20 in a clockwise direction so that the descending flight 50 is located at the right-hand side of FIG. 1.

A pair of endless roller chains 42 are positioned on opposite sides of the series 14 adjacent ends 32 of bucket 16. Each chain 42 has a plurality of coupling links 44 for attachment of the chains 42 to each pivot 36 at respective outermost lengths 38. It should be noted that the chains 42 cooperate with the tracks 20 to maintain a spaced relationship between the buckets 16 in series 14. Preferably, the coupling links 44 are arranged such that the spacing between adjacent brackets 16 in flight 46 is very small ($\frac{1}{8}$" to $\frac{1}{4}$") to minimize loss of water from the filling area.

Figure 3:
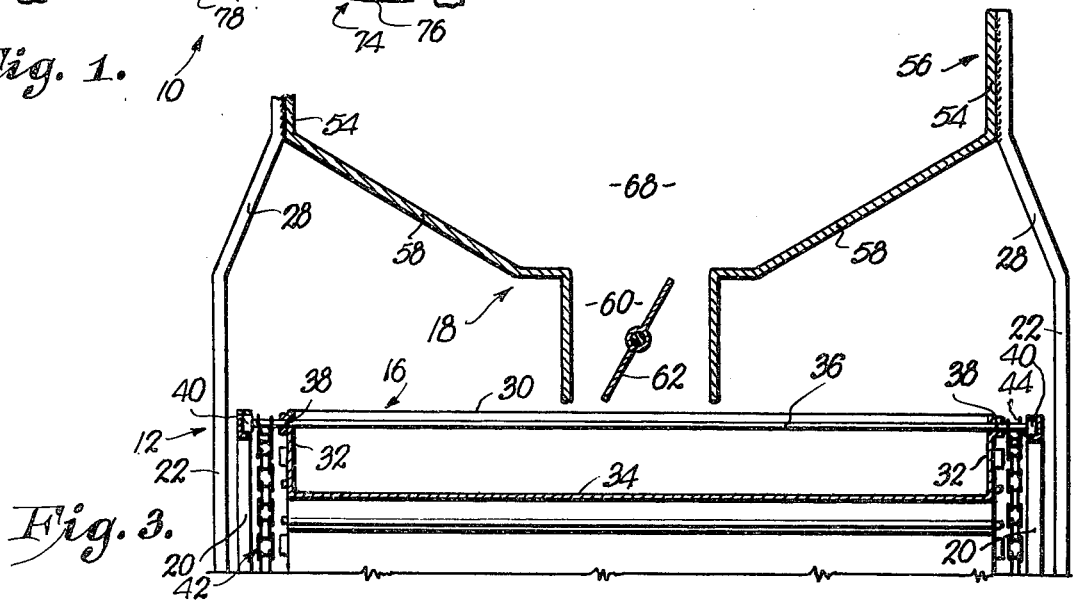
FIG. 3 is a partial cross-sectional view taken along line 3—3 of FIG. 2.

The water basin 18 is supported over filling flight 46 by the extensions 28 and includes a pair of upright sidewalls 54 held in spaced relationship by an end wall 56, and a synclined bottom 58 sloping downwardly toward an elongate, centrally disposed outlet 60. Outlet 60 is positioned approximately mid-length over the buckets 16 in flight 46 and extends substantially the full length of the latter such that water is permitted to flow from the basin 18 through outlet 60 to all of the buckets 16 in stretch 46. An elongate, flat baffle 62 is supported about its central axis by a rod 64 for pivotal movement within outlet 60. As seen for example in FIG. 3, the width of baffle 62 is substantially the same as the width of the outlet 60 such that the flow through the latter can be effectively controlled by selective pivoting movement of the baffle 62. Such movement is effected by a flow control leveler 66 provided on basin 18 at end 56.

Figure 2:
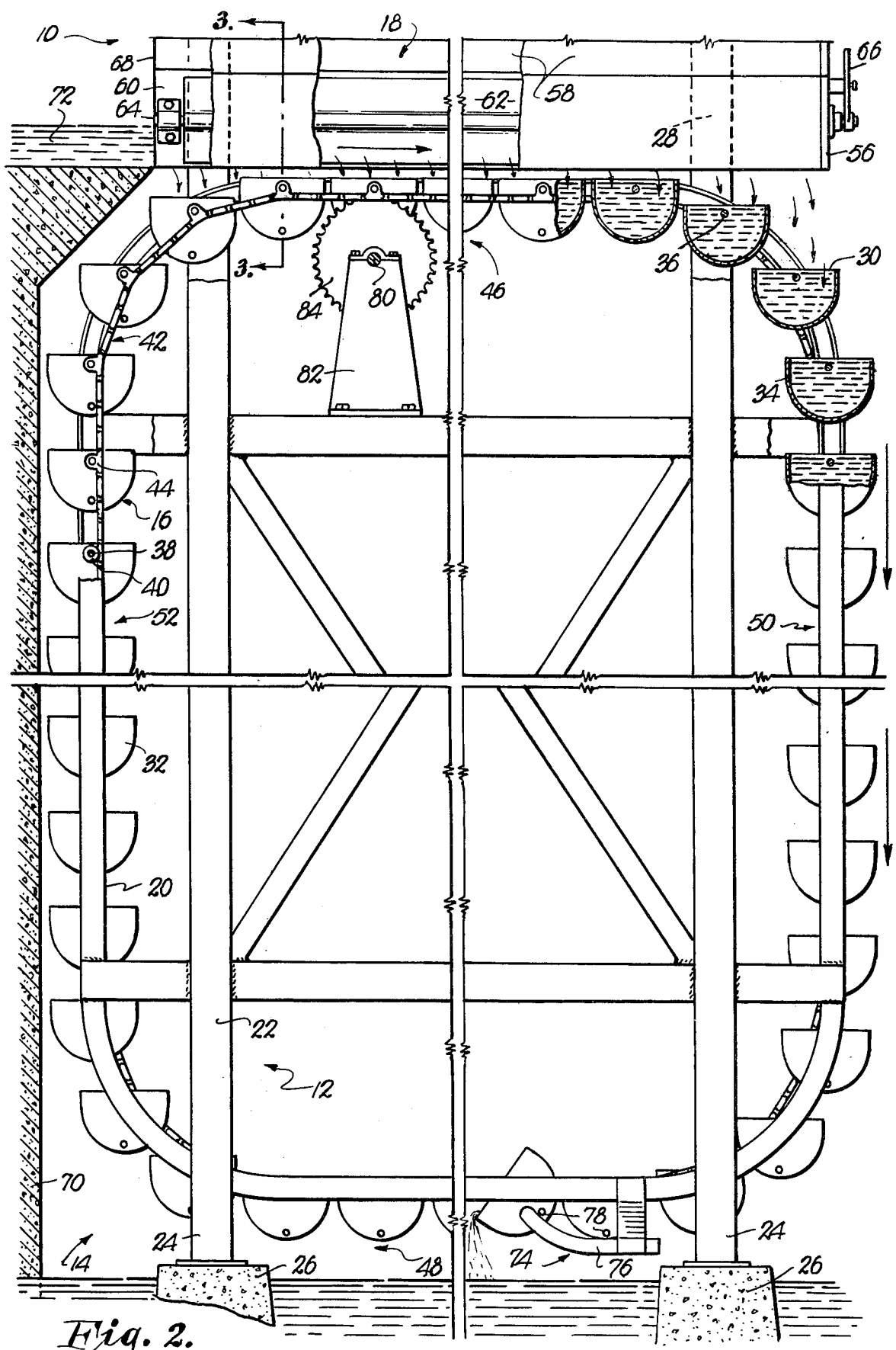
FIG. 2 is an enlarged, partial, side elevational view of the water motor shown in a practical use environment with portions thereof broken away.

It is important to note that the basin 18 is provided with an open end 68 opposite end 56 which is intended to be placed in communication with the crest of a water head. Thus, for example, as shown in FIG. 2, when the water motor 10 is positioned at the downstream face of a dam 70, the end 68 is placed in communication with a sluice 72 such that water behind the dam 70 may be directed into the basin 18 when it is desired to operate the water motor 10.

A trip 74 is provided on frame 12 adjacent the lowermost end of stretch 50. The trip 74 includes a pair of upwardly arcuate cam members 76 secured to respective tracks 20 and positioned for engagement with cooperating, outwardly extending pins 78 mounted on ends 32 at the lowermost portion of each bucket 16. The pins 78 on each bucket 16 cooperate with the cam members 76 to tilt the bucket 16 when the latter passes over the trip 74.

Mechanical output of the motor 10 is obtained from a drive shaft 80 supported for rotation by a pair of spaced, upright stanchions 82. A pair of large gears 84 (only one of which is shown in the drawings) on shaft 80 mesh with respective roller chains 42 for powered rotation of shaft 80 in response to the circuitous movement of series 14 about the tracks 20.

In operation, water is introduced into basin 18 and the baffle 62 is adjusted by control lever 66 until the desired rate of flow through outlet 60 is attained. As a result, the buckets 16 positioned immediately below outlet 60 in flight 46 are filled with water from outlet 60. At the same time, an external starting force of some type is applied to the series 14 causing the latter to move in a clockwise direction about tracks 20 (as viewed in FIG. 1) until the filled buckets 16 in flight 46 are shifted into the descending flight 50 whereupon movement of the series 14 will be effected by the loaded buckets 16 descending in flight 50.

As the initially filled buckets descend, additional unfilled buckets 16 are introduced into the filling flight 46 whereupon they receive water from basin 18 through the outlet 60. The weight of the descending buckets 16 in flight 50 is sufficient to self-propel the series 14, including the buckets 16 in flight 46, such that they too are sequentially introduced into the descending flight 50; in this manner there is established continuous clockwise movement of the series 14.

Once the loaded buckets reach the lowermost portion of flight 50 and begin a horizontal stretch of travel along flight 48, they sequentially encounter the cams 76 of trip 74. As the buckets 16 pass over the cams 76, they are tilted as described hereinabove for the purpose of dumping the water from the buckets 16. This tilting action continues until the bucket 16 reaches a disposition wherein all of the water carried thereby has been emptied, whereupon the bucket passes beyond the trip 74 and continues in its horizontal movement along flight 48 relieved of its heavy load of water. Of course, the emptied buckets 16 also continue unloaded along the ascending flight 52 until they are once again presented in a horizontal disposition along the filling flight 46.

As described previously, the continuous movement of series 14 around the rectangular path of travel defined by tracks 20 effects powered rotation of the output shaft 80. Should it be desired to change the rate at which the shaft 80 is driven, the operator simply adjusts lever 66 to vary the flow of water from basin 18 through outlet 60. In this manner the rate at which the buckets 16 are filled in flight 46 may be selectively increased or decreased, causing a corresponding change in the rate at which the series 14 travels around tracks 20.

It is important to recognize that the horizontal flight 46 provides a highly efficient means for properly filling each bucket 16 so that the latter travel along the entire length of vertical stretch 50 with a full load of water. In this regard, the elongate filling flight 46 disposes each bucket 16 in a filling position for a substantial amount of time relative to that found in prior art devices. Accordingly, the buckets may be filled slowly to avoid "splashover" caused by high-speed filling. It should also be noted that the flight 46 in cooperation with the uniquely arranged outlet 60 and baffle 62 permits use of substantially all of the water released from the head when the buckets 16 are arranged closely together as in the disclosed embodiment.

From the foregoing, it can be seen that there is presented an effective and highly efficient means for utilizing the potential energy from a head of water. With the device of the present invention, it is possible to capture substantially all of the water released from the head and to fill the water buckets in such a manner that they carry a full load through the entire vertical drop.

Having thus described the invention, what is claimed as new and desired to be secured by Letters Patent is:

1. In a water power apparatus:
  an endless series of elongated, open top buckets arranged to form a rectangle, presenting an upper horizontal flight, a lower horizontal flight and a pair of vertical flights;
  an elongated pivot for each bucket respectively suspending the same with its open top facing upwardly when in a normal pendant position;
  structure supporting the pivots for continuous, unidirectional movement thereof with the buckets suspended therefrom transversely of their longitudinal axes, whereby the same descend along one vertical flight and ascend along the other vertical flight;
  a water-receiving basin positioned over said upper flight and extending substantially the full length of the latter;
  an outlet in the basin disposed for gravitational flow of water therefrom into the buckets throughout the length of the upper flight;
  a trip at the lower flight for sequentially tilting the buckets about their pivots to dump the water therefrom;
  a driven shaft; and
  mechanism interconnecting the pivots and coupled with said shaft for driving the latter in response to movement of the pivots.

2. The invention of claim 1, said trip being positioned immediately adjacent said one flight.

3. The invention of claim 1, said mechanism including a pair of endless roller chains secured at respective opposite ends of said pivots and in meshing engagement with a sprocket on said shaft.

4. The invention of claim 1, each pivot suspending its respective bucket at a point below the open top of the latter.

5. The invention of claim 1, said structure including a pair of spaced, rectangularly configured channel tracks, and rollers at opposite ends of each of said pivots in captive rolling engagement with said tracks.

6. The invention of claim 1, said outlet extending parallel to the longitudinal axis of said upper flight and disposed centrally over said buckets.

7. The invention of claim 6, said outlet having a width less than one-half the length of said buckets.

8. The invention of claim 7, and an elongate baffle mounted on said basin for pivotal movement within said outlet in flow-controlling relationship to the latter.

* * * * *